June 9, 1959          H. D. JOHNSON          2,890,071
LOCKING ASSEMBLY FOR SPROCKETS, SHEAVES AND GEARS
Filed Nov. 29, 1956
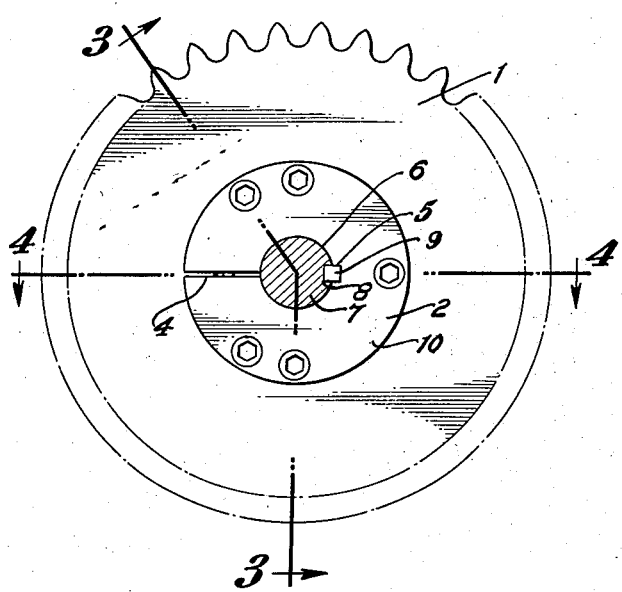
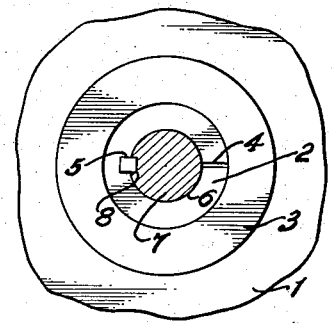
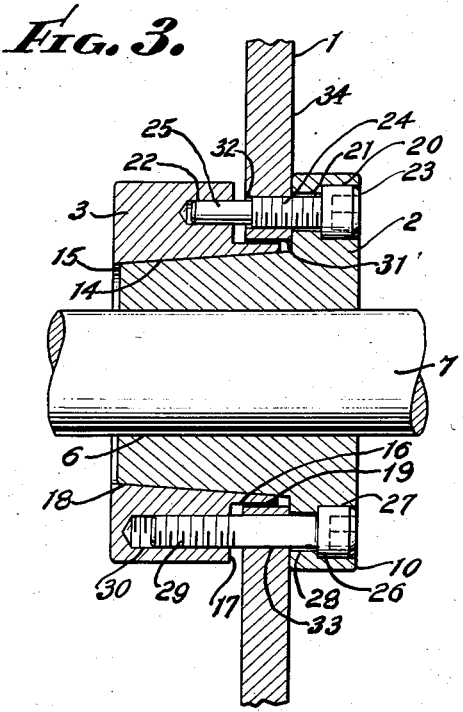
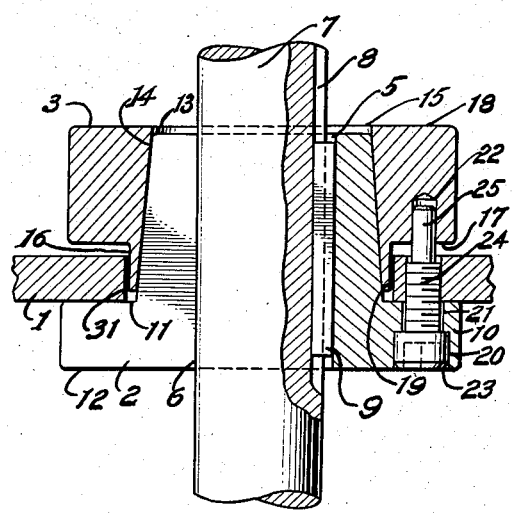
INVENTOR,
HARRY D. JOHNSON;
BY
ATTORNEY.

United States Patent Office 2,890,071
Patented June 9, 1959

2,890,071

LOCKING ASSEMBLY FOR SPROCKETS, SHEAVES AND GEARS

Harry D. Johnson, Lynwood, Calif.

Application November 29, 1956, Serial No. 625,024

1 Claim. (Cl. 287—52.06)

The present invention relates to a means for securing sprockets, sheaves, gears, or other devices to a split bushing carried on a shaft and utilizing a hub for engagement with the bushing for clamping the bushing to the shaft. The arrangement is such that the sprocket, sheave or gear is fastened directly to the bushing in such a manner as to eliminate wobble and run-out, sometimes found in present types of assemblies due to an uneven tightening of the bushing and the sprocket, sheave or gear. Welding is not needed for the fastening of the various elements of the assembly, and no dishing or distortion occurs in the sprocket, sheave or gear. At the same time, replacement of the sprocket, sheave or gear is easy of accomplishment, at a minimum of cost and time. In the case of plate type sprockets, dealers usually stock the same. However, if the particular size of plate type sprocket is not available, a substitute may be bored and drilled, using the old sprocket for a jig, no special fixtures being required.

An object of the invention is to provide an assembly for holding a sprocket, sheave or gear which will maintain the concentricity of said elements.

A further object is the provision of an assembly for holding various elements, which is inexpensive in cost of manufacture, foolproof in operation, and generally superior to devices of this character now known to the inventor.

With the above mentioned and other objects in view, the invention consists in the novel and useful provision, formation, construction, association, and relative arrangement of parts, members and features, all as shown in a certain embodiment in the accompanying drawing, described generally, and more particularly pointed out in the claim.

In the drawing:

Figure 1 is a side elevation of a sprocket secured by the means of the present invention to a shaft, Figure 2 is a fragmentary view looking in the direction of the arrow 2 of Figure 4, Figure 3 is a fragmentary sectional view on the line 3—3 of Figure 1, and, Figure 4 is a fragmentary sectional view on the line 4—4 of Figure 1.

Referring now with particularity to the drawing, the assembly for securing work which, in this instance, is shown as a plate type sprocket 1, includes a bushing 2 and a hub 3. The said bushing is split at 4 and provided with a keyway 5 which extends transversely of the bushing adjacent the bore 6 thereof. The shaft 7 upon which the bushing is mounted is provided with a longitudinal keyway 8, there being a key 9 between said keyways 5 and 8, as shown in Figure 4. The bushing is provided at one end with a flange 10 having plane inner and outer surfaces 11 and 12. These surfaces, in the present instance, are substantially parallel and in right angular relationship to the axis of the shaft 7. The surfaces 11 and 12, which are annular in nature, are likewise in right angular relationship to the bore 6 of the bushing. As shown, the periphery of the bushing from the inner face 11 of the flange to the opposite end 13 is tapered as shown at 14. The hub 3 cooperates with the tapered surface 14 of the bushing. This hub is formed with a tapered bore 15, the degree of taper being the same or complementary to the degree of taper of the bushing, and said hub is provided with a reduced diameter end flange or shoulder 16 axially extending from end wall 17, which wall 17 is substantially parallel with the end wall 18. The periphery 19 of the flange 16 is in right angular relationship to the wall 17. The tapered bore 15 extends through the flange 16, as shown. The flange 10 of the bushing is transversely bored and counter-bored, as shown at 20 and 21, at three points which are equidistantly spaced 120° apart, and affording entrance through the wall 17 into the hub are three equidistantly spaced apart transverse bores, as shown for one of the bores at 22, in Figure 3. Three socket headed screws are utilized, one of which is detailed in Figures 3 and 4, which screws are designated as 23, in each instance, and the heads of which are confined within the bores 20 while the screw shanks 24 are passed through the bores 21, the shanks terminating in unthreaded, reduced diameter pins 25 for reception within bores 22 of the hub. The portion 25 in each instance acts as a locating pin for the hub, and the unthreaded bore 21 has greater diameter than the diameter of the threaded part of the screw. I provide two socket headed screws 26 which are diametrically positioned relative to both the bushing and the hub, the bushing to this end being provided with two transverse bores, one of which is shown at 27 and counter bored at 28 (see Figure 3), the shank of each screw being unthreaded in part and threaded at 29 for reception in a threaded transverse bore 30 of the hub. As stated, two bores and counter bores 27 and 28 and threaded bores 30 are provided for both the bushing and the hub and arranged in diametrical relationship. The socket headed screws 26 are for the purpose of tightening the hub on the tapered surface 15 of the bushing to contract the bushing, due to the split 4, into tight engagement with the periphery of the shaft 7.

The plate type sprocket 1, which is shown for illustrative purposes, has its axial bore 31 of such diameter as to fit on the periphery of flange 16 of the hub. The said sprocket is provided with three equidistantly spaced threaded bores, one of which is shown at 32 for threaded engagement with the threaded shanks 24 of the socket headed screws 23, and the said sprocket is drilled transversely at two diametric points, as shown for one of said bores at 33, for free passage of the unthreaded shank portions of the socket headed screws 26. Thus, when the three socket headed screws 23 are positioned in the bores and counter-bores 20 and 21 of the bushing, the threaded shank engages the threaded bores 32 of the sprocket, while the pins 25 correctly locate the three bores of the hub, and a tightening of the said screws 23 will bring one plane surface 34 of the sprocket into engagement with the plane surface 11 of flange 10. A tightening of the screws 26 will draw the hub on the tapered surface 14 of the bushing, forcing the bushing into tight engagement with the shaft 7, and at the same time assuring the concentricity of the sprocket relative to the bushing and the said hub. Obviously, the hub, by being solid, acts to strengthen the split bushing and lends to the transmitting power of the bushing to the shaft. The enlarged bores at 21 and 28, in the hub, allow for movement of the bushing when it is contracted by the hub, without in any manner affecting the screws or the said sprocket. Preferably, the sprocket is fastened to the bushing by the screws 23 by leaving the screws slightly loose to begin with, and then tightening the said hub on the said bushing by means of the screws 26, followed by a tightening of the screws 23.

The operation, uses and advantages of the invention are as follows:

I may, of course, utilize devices other than the sprocket shown, such as previously mentioned, to wit, a sheave or a gear, the hub of the sheave being bored to accommodate the screws 23 and 26 in the manner just described for the sprocket. By fastening the sprocket, sheave or gear directly to the face 11 of the bushing, which face is in right angular relationship to the axis of the bushing, I assure that no wobble will occur in the sprocket, sheave or gear due to any uneven tightening of the respective screws 23. In fact, the present invention has the accuracy of an ordinary bolt on hub, along with the benefits of the taper lock unit for the taper portion is so constructed that the alignment is not affected by the taper in either the hub or the bushing. It is also evident that the tolerances manufactured into the elements remain the same regardless of whether or not the tapered hub take-up screws 26 are tightened evenly or not. The concentricity of the sprocket, sheave or gear is assured by reason of the solid annular surface of flange 16 of the hub, which is machined to fit the bore 31 of the sprocket, gear or sheave. With the tapered locking action between the hub and the bushing, as disclosed for this invention, there is no run-out of the sprocket, sheave or gear, and the angle of taper may be less than in present types now known to the inventor. In addition, the over-all dimensions of the hub may be kept at a minimum and still give an efficient clamping action of the split bushing on the shaft.

In certain installations, I may dispense with that type of screw which employs the pin 25 for entrance within bores, such as 22. However, I have found that the addition of the pin adds greater working and shear strength to the unit.

I claim:

The combination with a sprocket or other tool adapted to be mounted for rotation on a shaft, of means for mounting said sprocket, including a split bushing provided with an end flange and with a tapered periphery, a hub having a tapered bore for movement on the tapered periphery of the bushing to compress the bushing on said shaft, said hub provided with an extended end flange, the periphery of which is concentric with the shaft, and the wall bounding the bore in said sprocket having a machine-fit engagement with the periphery of the hub flange; the said bushing flange having a face in normal relationship to the axis of said bushing, the said bushing flange provided with smooth transverse bores and the said sprocket provided with threaded bores registering with the transverse bores in the bushing flange and screws passed freely through the bores of the bushing flange for engagement with the threaded bores in the said sprocket, said screws provided with unthreaded locating pins and the said hub provided with bores registering with the threaded bores in the said sprocket, and in the said bushing flange for receiving said pins.

References Cited in the file of this patent

UNITED STATES PATENTS

| | | |
|---|---|---|
| 123,413 | Newell | Feb. 6, 1872 |
| 165,546 | Cook | July 13, 1875 |
| 929,762 | Hess | Aug. 3, 1909 |
| 2,669,471 | Breslow | Feb. 16, 1954 |
| 2,710,762 | Whitaker | June 14, 1955 |